United States Patent [19]

Shima et al.

[11] Patent Number: 4,881,753

[45] Date of Patent: Nov. 21, 1989

[54] AIR SUSPENSION SYSTEM WITH AN AIR DRIER

[75] Inventors: Kotaro Shima, Toyota; Masaharu Ohba, Aichi; Masakatsu Nonaka, Toyota, all of Japan

[73] Assignee: Toyota Jidosha Kabushiki Kaisha, Aichi, Japan

[21] Appl. No.: 277,187

[22] Filed: Nov. 29, 1988

[30] Foreign Application Priority Data

Nov. 30, 1987 [JP] Japan ................ 62-301666

[51] Int. Cl.⁴ .............................. B60G 17/08
[52] U.S. Cl. ........................... 280/707; 280/DIG. 1; 280/711
[58] Field of Search .................. 280/707, DIG. 1, 711

[56] References Cited

U.S. PATENT DOCUMENTS

| | | | |
|---|---|---|---|
| 2,976,053 | 3/1961 | Pribonic et al. | 280/707 |
| 3,121,573 | 2/1964 | Alfieri et al. | 280/707 |
| 3,608,925 | 9/1971 | Murphy | 280/707 |
| 3,874,692 | 4/1975 | Ono | 280/707 |
| 4,377,293 | 3/1983 | Senoo | 280/707 |
| 4,453,725 | 6/1984 | Kuwana | 280/707 |
| 4,625,994 | 12/1986 | Tanaka et al. | 280/707 |

FOREIGN PATENT DOCUMENTS

| | | |
|---|---|---|
| 5028589 | 9/1975 | Japan . |
| 58-104711 | 7/1983 | Japan . |
| 58-164909 | 11/1983 | Japan . |
| 61-27711 | 2/1986 | Japan . |
| 61-99730 | 5/1986 | Japan . |

*Primary Examiner*—Kenneth R. Rice
*Attorney, Agent, or Firm*—Oliff & Berridge

[57] ABSTRACT

An air suspension system with an air drier that adjusts vehicle height quickly especially when lowering the height. This system also efficiently maintains the desiccating capacity of the air drier. In lowering the vehicle, all the air discharged from an air actuator is compressed by a compressor and supplied to an accumulator, thus reducing the load on the compressor. When vehicle height is not adjusted and the pressure in the accumulator exceeds a preset value, the air is released from the accumulator into the atmosphere through a throttle valve and the air drier to restore the capacity of the desiccating material in the air drier.

4 Claims, 4 Drawing Sheets

AIR SUSPENSION SYSTEM WITH AN AIR DRIER

BACKGROUND OF THE INVENTION

The present invention relates to an air suspension system with an air drier for adjusting a vehicle height by supplying air to and discharging air from an air actuator provided for each wheel of the vehicle.

There are currently many air suspension systems for adjusting a vehicle height by supplying the compressed air to and discharging it from the air actuators. The compressed air is usually dried to prevent condensation in the air suspension system. The air drier, however, has limited capacity, thus its capacity for absorbing moisture will be lost eventually. To eliminate this problem, some prior-art systems have been proposed. One example is the air suspension system in Japanese Published Unexamined Utility Model Application S58-104711. When the pressure in an accumulator is low, the air that is discharged from an air actuator (air spring) to lower the vehicle height is compressed and then stored in the accumulator. This reduces the load on the compressor and the amount of pumping energy required. When the pressure in the accumulator is high, the air discharged from the air actuator to lower the vehicle height is released into the atmosphere through the air drier. This restores the drier's dehumidifying capacity. In another conventional air suspension system in Japanese published unexamined patent application S61-99730, the air discharged from the air actuator to lower the vehicle height is released into the atmosphere through the air drier to restore the drier's moisture-absorbing capacity. In addition, in this air suspension system, when the pressure in the accumulator is higher than a predetermined value, the compressed dry air in the accumulator is released into the atmosphere through the drier until the pressure in the accumulator reaches a preset value. Thus, the dehumidifying capacity of the drier is efficiently restored.

These prior-art systems, however, still have some deficiencies. In the first example, air from the actuator must pass through an air throttle valve before discharge into the atmosphere. The valve reduces the air pressure in the drier, which improves the restoration rate of the desiccant in the drier but also increases the time needed to lower the vehicle height. This has the drawback that it takes longer to lower the vehicle height.

In the second example, restoration of the desiccant is more efficient but again a throttle valve is used so vehicle height lowering time remains excessive. Moreover, since the air discharged when lowering the vehicle height is not recycled, the load on the compressor is large.

SUMMARY OF THE INVENTION

One object of the present invention is to provide an air suspension system with an air drier that reduces the time needed for lowering the vehicle height and reduces the load on the compressor to save energy.

Another object is to provide an air suspension system that allows the air drier to recover its dehumidifying capacity using a simpler air circuit.

To achieve these objects, the present invention has the following design. As illustrated in FIG. 1, this air suspension system for a vehicle has: an air actuator M3 for each wheel of the vehicle and a compressor M1 for supplying air to the air actuator M3. The system's air circuit includes a first path P1 connecting the compressor M1 and the air actuator M3 via a raising valve M5 and a second path P2 connecting the air actuator M3 and the compressor M1 through a lowering valve M6. The first path P1 has an accumulator M2 equipped with a pressure sensor M8. An air drier M4 in the first path P1 between the accumulator M2 and the compressor M1 contains a reversible desiccant. An exhaust path P3 in the first path P1 branches between the air drier M4 and the compressor M1, and has a discharge valve M7 for discharging air from the air circuit to the atmosphere. Also in the first path P1 is a one-way throttle valve M11 between the accumulator M12 and the air drier M4 for lowering the pressure of the air from the accumulator M2 and for freely passing the air from the drier M4. A vehicle height controller M9 operates the raising valve M5 and the lowering valve M6 to feed air to and discharge air from the air actuator M3. A subsidiary controller M10 opens the discharge valve M7 when both the raising valve M5 and the lowering valve M6 are shut and the pressure of the accumulator M2 is higher than a preset value, whereby the air is externally discharged from the accumulator M2 through the throttle valve M11 and the drier M4, and the drier M4 is regenerated.

In the air suspension system of the present invention, when the vehicle is to be lowered, the vehicle height controller M9 opens the lowering valve M6 and operates the compressor M1; thus the accumulator M2 reserves all of the air discharged from the air actuator M3. Since the one-way throttle valve M11 does not function in this direction, the air passes through the valve M11 freely and vehicle is lowered in less time.

The present invention, therefore, provides an air circuit with a simple structure which can lower the vehicle height in a reduced period. When no vehicle height adjustment occurs and the pressure sensor M8 detects that the pressure in the accumulator M2 exceeds a preset limit, the subsidiary controller M10 opens the discharge valve M7 to release the compressed air from the accumulator M2 into the atmosphere through the throttle valve M11 in the throttle's active direction and the air drier M4. This efficiently regenerates the desiccant in the air drier M4.

DETAILED DESCRIPTION OF THE PREFERRED EMBODIMENTS

This invention is first embodied in an air suspension system of an automobile for adjusting the height of a pair of wheels.

Figure 2:
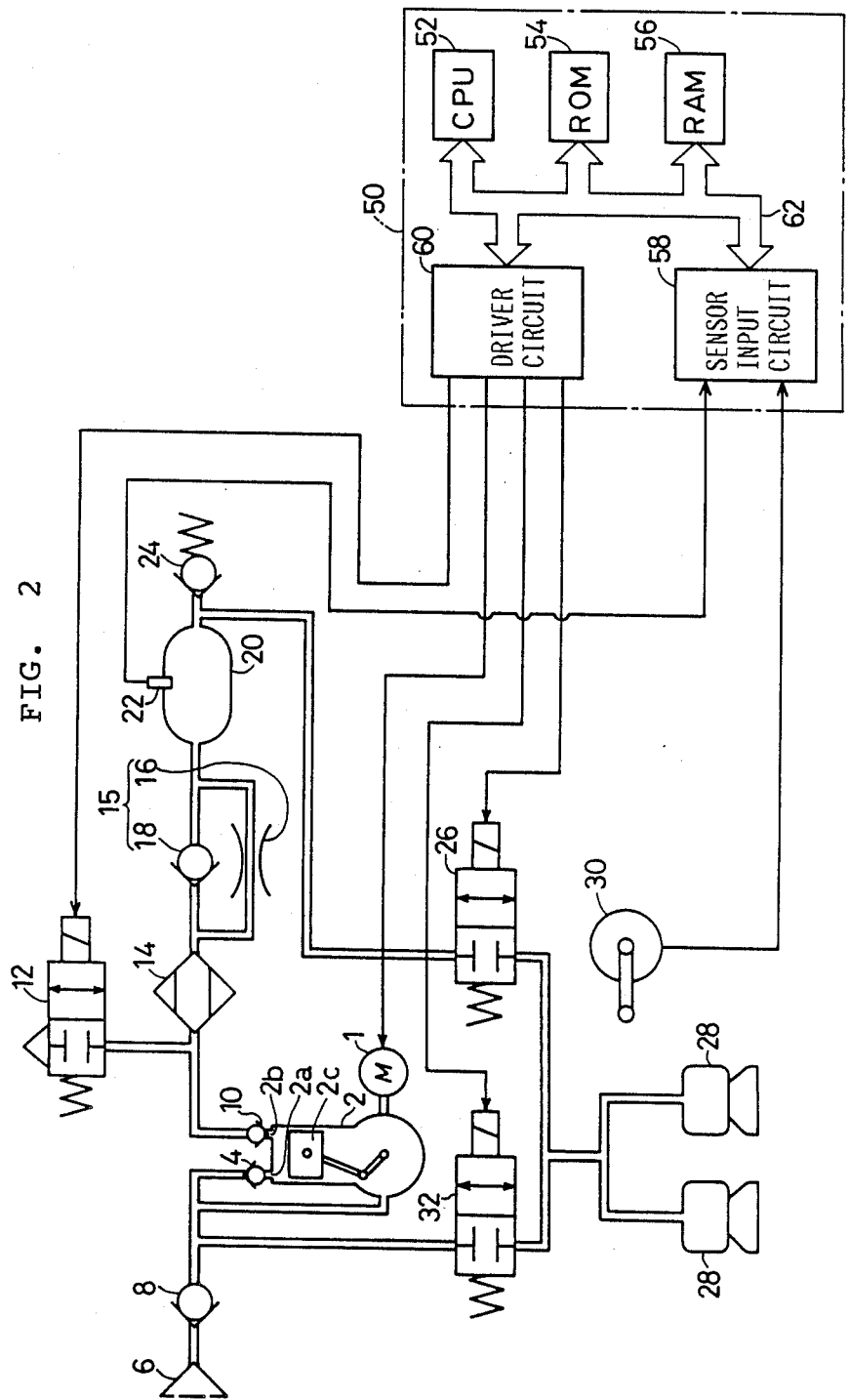
FIG. 2 is a schematic design of one embodiment of the present invention.

The air circuit shown in FIG. 2 has a compressor 2 with a motor 1 to compress air. An intake 2a of the compressor 2 connects to a check valve 4 that prevents a reverse flow. The check valve 4 is connected to the atmosphere via an air filter 6 and a check valve 8 that prevents the air from leaking back to the atmosphere. An outlet 2b of the compressor 2 connects with another check valve 10, which prevents the air from flowing back to the compressor 2. The outlet check valve 10 is connected to a discharge valve 12 that opens to the atmosphere. The outlet check valve 10 also connects to an air drier 14 containing a known reversible desiccant, such as silica gel. The air drier 14 connects to a one way throttle valve 15 composed of a fixed throttle 16 and a check valve 18 arranged parallel to each other. This one-way throttle valve 15 connects the air drier 14 to an accumulator 20 that stores the compressed air. The accumulator 20 is equipped with a pressure sensor 22 that generates an ON signal when the pressure in the accumulator 20 exceeds a preset value P1. The preset value P1 is the minimum necessary to raise vehicle height by supplying the compressed air to air actuators (air springs) 28 at least once. The accumulator 20 also has a relief valve 24 that opens when the pressure in the accumulator 20 exceeds another preset value P2, which is higher than the first preset value P1. This relief valve 24 protects the accumulator 20 when the pressure in the accumulator 20 becomes too high.

The accumulator 20 is connected to two air actuators 28 through a raising valve 26. Each of the actuators 28 corresponds to a wheel of the vehicle. The air actuators 28 are connected to a lowering valve 32 and then to the inlet 2a of the compressor 2 via the check valve 4. The pipe from the lowering valve 32 also leads to the rear of a piston 2c of the compressor 2 to reduce operational loads of the compressor 2.

Vehicle height is adjusted using the air actuators 28; the height is raised by supplying air to the air actuators 28 and is lowered by discharging air from the air actuators 28. The air suspension system of the invention also has a vehicle height sensor 30. The vehicle height sensor 30 generates a HIGH signal when the vehicle height exceeds a predetermined standard range, a STANDARD signal in the standard range, and a LOW signal when lower than the standard range.

In the present system, the discharge valve 12, raising valve 26, and lowering valve 32 are normally closed 2-position-type solenoid valves, but other types of control valves may also be used if they can be opened and closed selectively. The compressor 2 may be activated by not only the motor 1 but also an engine of the automobile (not shown) using an electromagnetic clutch or the like. In such a case, the electromagnetic clutch controls for operation of the compressor 2.

The air suspension system in the present embodiment is controlled by an electronic control unit (ECU) 50 that is a microcomputer comprising a CPU 52, ROM 54, RAM 56, and input/output (I/O) interfaces. The I/O interfaces comprise a driver circuit 60 and a sensor input circuit 58, the driver circuit 60 being connected with the motor 1, discharge valve 12, raising valve 26, and lowering valve 32, and the sensor input circuit 58 being connected with the pressure sensor 22 and vehicle height sensor 30. These elements are connected to one another by means of an interconnection bus 62.

Figure 3:
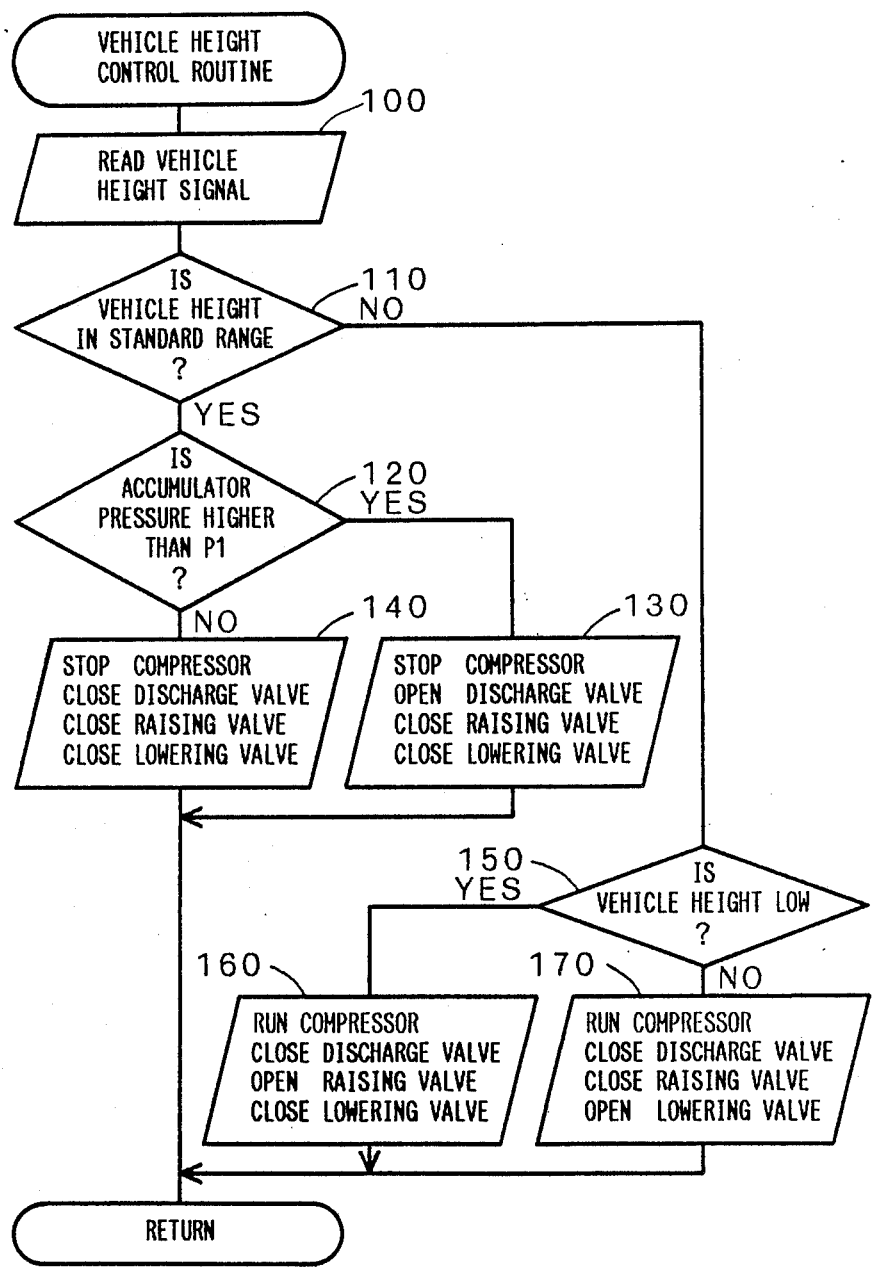
FIG. 3 is a flow chart showing a control routine performed in an electronic control unit of the present embodiment.

The processings performed by the ECU 50 are explained using the flow chart in FIG. 3.

When the key switch of the automobile (not shown) is turned on, the ECU 50 starts a vehicle height control routine shown in FIG. 3 together with other control routines. In the vehicle height control routine, first, a signal is received from the vehicle height sensor 30 by the sensor input circuit 58 at step 100, and it is determined at step 110 whether this vehicle height is in a predetermined middle position according to the signal from the height sensor 30. If so, the flow goes to step 120 where it is determined whether the pressure sensor 22 is generating an ON signal, i.e., whether the pressure in the accumulator 20 exceeds the preset value P1. If so, the driver circuit 60, at step 130, sends a drive signal to open the discharge valve 12 and keeps the compressor 2 at a stop. In this case, the driver circuit 60 sends no drive signal to either the raising valve 26 or the lowering valve 32, thus keeping them closed. By opening only the discharge valve 12, the pressure of the air discharged from the accumulator 20 is reduced past the fixed throttle 16 to be much lower than when compressed by the compressor 2 and stored in the accumulator 20. The compressed air, which has been reduced in pressure and increased in volume, flows into the air drier 14 and efficiently removes moisture from the desiccant in the air drier 14 thus restoring the capacity of the air drier 14 to dehumidify. Then, the air is discharged to the atmosphere through the discharge valve 12.

The air discharging is repeated until it is determined at step 120 that the pressure in the accumulator 20 is less than the preset value P1. Then, the discharge valve 12 is closed at step 140. If the pressure in the accumulator 20 is less than the preset value P1 in the step 120, the flow immediately goes to step 140 where the compressor 2 is quiescent, and the discharge valve 12, raising valve 26, and lowering valve 32 are all closed. This prevents the discharge of the compressed air in the accumulator 20, reserving the air for the subsequent vehicle height adjustment.

If step 110 determines that vehicle height is not in the middle position, then it is determined at step 150 whether the vehicle height is in a low position according to the signal from the height sensor 30. If so, the driver circuit 60 transmits a drive signal to the motor 1 to run the compressor 2 at step 160. At the same time, the raising valve 26 is opened while the discharge valve 12 and the lowering valve 32 are kept closed. Consequently, the compressor 2 takes in outside air through the inlet 2a via the air filter 6 and the check valve 8. The compressed air passes through the air drier 14 where the desiccant dehumidifies the air. Then, the air is freely supplied to the accumulator 20 through the check valve 18 and into the air actuators 28. This control routine is repeated to raise the vehicle height by supplying the compressed air to the air actuators 28 until step 110 determined that the vehicle height is in the middle position. Subsequently, the activation of the compressor 2 by the motor 1 stops and the raising valve 26 closes in step 130 or 140.

If step 150 determines that the vehicle height is not in the low position, i.e., it is in a high position, the compressor 2 runs and the lowering valve 32 opens at step 170 while the discharge valve 12 and the raising valve 26 close. As a result, the compressor 2 compresses all of the air discharged from the air actuators 28, and then sends the air to the accumulator 20 through the air drier 14 and the check valve 18. Since the pressure of the air discharged from the air actuators 28 exceeds atmospheric pressure, the air pressure energy is conserved, and the load on the compressor 2 is reduced. This control routine is repeated to lower the vehicle height by discharging the air from the air actuators 28 until step 110 determines that vehicle height is in the middle position. Subsequently, the activation of the compressor 2 by the motor 1 stops and the lowering valve 26 closes in step 130 or 140.

In order to clarify the processes at steps 130, 140, 160, and 170, TABLE 1 shows the relationships between the vehicle height positions, the signals from the pressure sensor 22, and the operational states of the compressor 2, the discharge valve 12, the raising valve 26, and the lowering valve 32.

TABLE 1

| VEHICLE HEIGHT POSITION | Low | High | Middle | |
|---|---|---|---|---|
| PRESSURE SENSOR | irrelevent | irrelevent | ON | OFF |
| COMPRESSOR | running | running | quiescent | quiescent |
| DISCHARGE VALVE | closed | closed | open | closed |
| RAISING VALVE | open | closed | closed | closed |
| LOWERING VALVE | closed | open | closed | closed |

Figure 1:
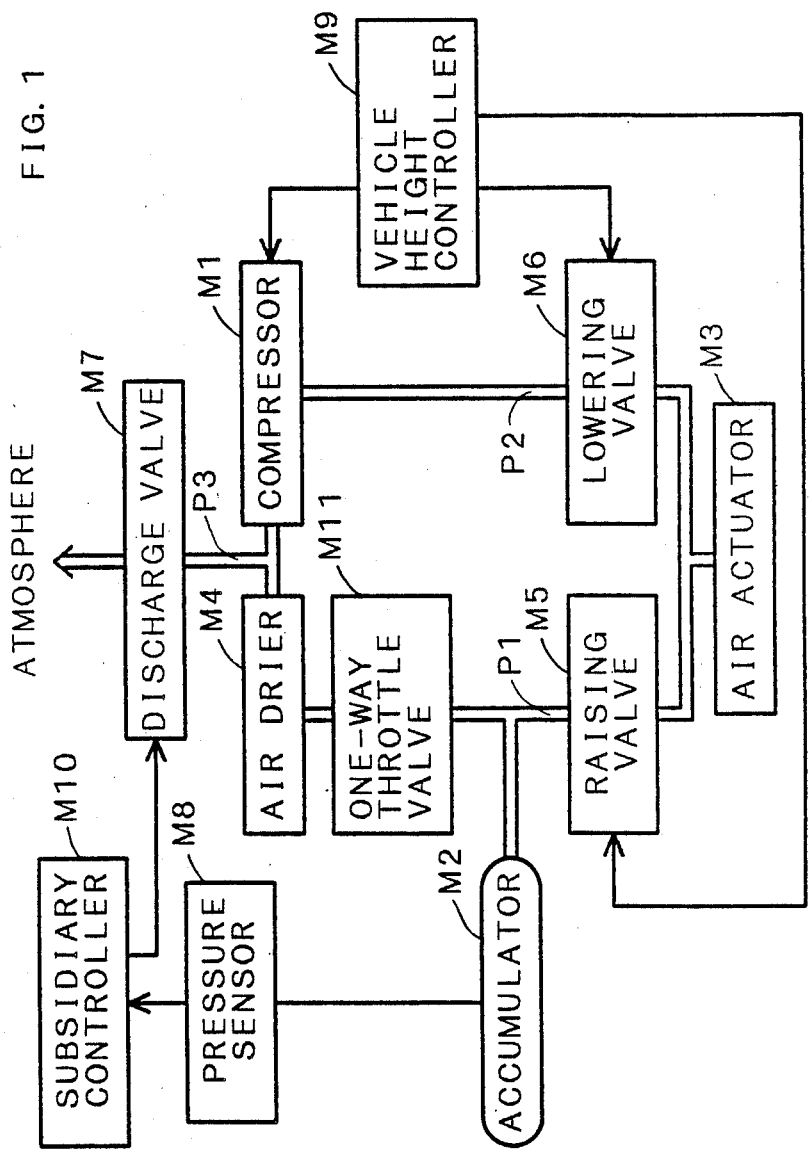
FIG. 1 is a block diagram outlining the structure of an air suspension system of the present invention.

The control routine ends after any of steps 130, 140, 160, or 170. The ECU 50 at steps 110 and 150-170 corresponds to the vehicle height controller M9; the ECU 50 at steps 110-140 corresponds to the subsidiary controller M10 in FIG. 1.

With the the air suspension system of the present embodiment, when the vehicle height is to be raised, the raising valve 26 is opened, and the air from the external is compressed in the compressor 2, dried in the air drier 14, and then supplied to the accumulator 20 and the air actuators 28 (steps 150 and 170). When the vehicle height is to be lowered, the lowering valve 32 is opened, and all of the air discharged from the air actuators 28 is compressed in the compressor 2 and then supplied to the accumulator 20 without passing through the fixed throttle 16 (steps 150 and 160). When vehicle height is in the middle position and the pressure in the accumulator 20 exceeds the preset value P1, the discharge valve 12 is opened and the compressed air from the accumulator 20 is released to the atmosphere through the fixed throttle 16 and the air drier 14, thus restoring the capacity of the desiccant in the air drier 14 (steps 110, 120, and 130). The air suspension system of the present embodiment, therefore, can reduce the load on the compressor 2 and save energy. In addition, it can lower the vehicle height faster by using a simpler air circuit with fewer control valves.

Figure 4:
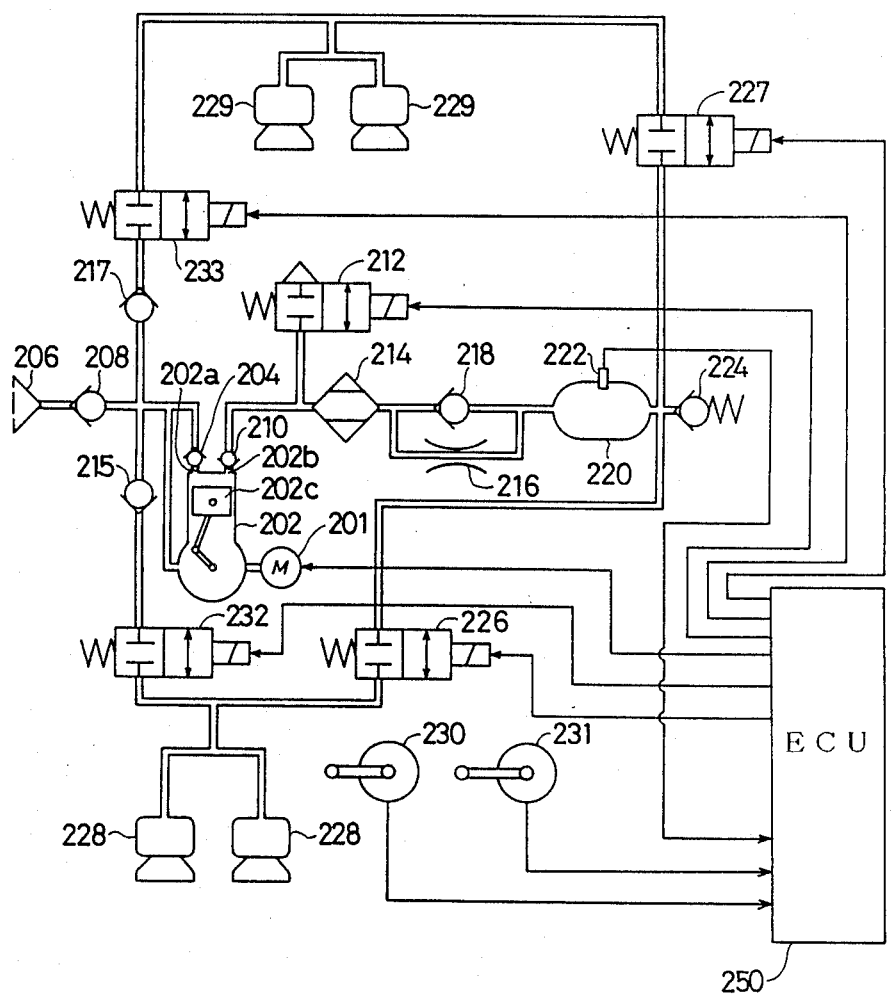
FIG. 4 is a schematic design of a second embodiment of the present invention.

The above embodiment deals with two air actuators 28, 28 with the height control performed simultaneously on both air actuators. A second embodiment of the invention includes four air actuators, rear pair 228, 228 and front pair 229, 229, with each actuator corresponding to one of the four wheels of a vehicle; the vehicle height is adjusted independently at front and rear of the vehicle. FIG. 4 shows a design diagram of this embodiment. FIG. 4 includes many components similar to those in FIG. 2 and those similar components are designated by numerals having same lower two digits. Only those points different from the first embodiment are explained below.

Each of the rear wheels has an air actuator 228 and the air flow to and from each air actuator 228 is controlled by a rear raising valve (UpR) 226 and a rear lowering valve (DnR) 232. Similarly, each of the two front wheels has an air actuator 229 with a front raising valve (UpF) 227 and a front lowering valve (DnF) 233. Both the rear and front raising valves 226, 227 are connected to the accumulator 220, and the rear and front lowering valves 232, 233 are connected to the inlet 202a of the compressor 202. An important difference from the first embodiment is that check valves 215 and 217 are placed between the respective lowering valves 232, 233 and the inlet 202a. These check valves 215, 217 prevent air flow toward the air actuators 228, 228, 229, 229. Rear and front vehicle height sensors 230, 231 are provided for respective axle of the wheel, and send respective height signals, each including the HIGH, STANDARD, and LOW signals, to the ECU 250.

The vehicle height control of this second embodiment is basically same as that of the first embodiment: the ECU 250 controls the solenoid valves 212, 226, 227, 232, 233 and the compressor (COMP) 202, according to the vehicle height positions determined based on the sensed signals from the height sensors 230, 231 and the pressure sensor (P) 222, as illustrated in TABLE 2.

TABLE 2

| | VEHICLE HEIGHT POSITION | | SENSOR P | VALVES | | | | | COMP |
|---|---|---|---|---|---|---|---|---|---|
| No. | Front | Rear | 222 | UpF 227 | DnF 233 | UpR 226 | DnR 232 | EXT 212 | 202 |
| 1 | Mid | Mid | OFF | C | C | C | C | C | Q |
| 2 | Hgh | Mid | — | C | O | C | C | C | R |
| 3 | Low | Mid | — | O | C | C | C | C | R |
| 4 | Mid | Hgh | — | C | C | C | O | C | R |
| 5 | Mid | Low | — | C | C | O | C | C | R |
| 6 | Low | Hgh | — | O | C | C | O | C | R |
| 7 | Hgh | Low | — | C | O | O | C | C | R |
| 8 | Low | Low | — | O | C | O | C | C | R |
| 9 | Hgh | Hgh | — | C | O | C | O | C | R |
| 10 | Mid | Mid | ON | C | C | C | C | O | Q |

VALVE operations: O = open, C = closed
COMPressor: R = running, Q = quiescent

When the front vehicle height is in the low position, the front raising valve (UpF) 227 opens and the compressor 202 runs, while other valves remain closed. External air is then admitted into the compressor 202 and fed into the accumulator 220 and the front air actuators 229, 229. When, on the other hand, the front height is in the high position, the front lowering valve (DnF) 233 opens and the compressor 202 runs. The air in the actuators 229, 229 is transferred to the accumulator 220 without resistance through the throttle 216. Thus, the front vehicle height is lowered quickly and compressor energy is conserved as in the first embodiment. Analogous operations are performed for the rear height adjustment.

When both the front and rear vehicle heights are in the high position (case No. 8 of TABLE 2), air is simultaneously discharged from the front actuators 229, 229 and from the rear actuators 228, 228. Without the check valves 217 or 215, following problem occurs.

The air pressures in the front actuators 229, 229 and that in the rear actuators 228, 228 are not always the same, due to a difference in load distribution between the front and rear, to a difference in effective diameter of the air actuators 228, 229, or to other factors. Suppose, for example, the front actuators 229, 229 have higher pressure than the rear actuators 228, 228, air from the front actuators 229, 229 goes to the rear actuators 228, 228 when both the lowering valves 233, 232 open. This temporarily results in an un-intentional raising of the rear vehicle height.

The two check valves 217, 215 prevent the problem and assure control of the vehicle height adjustment for both front and rear heights.

When the front or rear vehicle height is in the middle position, the corresponding raising valves 227 or 226 and the lowering valves 233 or 232 are closed and no air is transferred to the actuators 229, 229 or 228, 228. Further, when both the front and rear vehicle heights are in the high position and the pressure P in the accumulator 220 is higher than P1 (case No. 10 of TABLE 2), the discharge valve (EXT) 212 is opened and the air in the accumulator 220 is discharged first through the throttle 216 and then through the air drier 214. The drier 214 is thus effectively regenerated.

As many different embodiments of this invention may be made without departing from the spirit and scope thereof, it must be understood that the invention is not limited to these specific embodiments, and is limited only as defined in the appended claims.

What is claimed is:

1. An operating method of an air suspension system including an air actuator, a compressor, an accumulator, and an air drier containing reversible desiccating material, the method comprising the steps of:
   feeding air from the compressor first through the air drier and then into the air actuator and into the accumulator to raise the vehicle height;
   reserving air discharged from the air actuator in the accumulator to lower the vehicle height; and
   passing air that is discharged from the accumulator to the atmosphere first through a throttle valve then through the air drier if the vehicle height is not adjusted and the pressure of the accumulator exceeds a preset value.

2. An air suspension system for a vehicle comprising:
   an air actuator for a wheel of the vehicle;
   a compressor for supplying air to the air actuator;
   an air circuit including a first path connecting the compressor and the air actuator through a raising valve, and a second path connecting the air actuator and the compressor through a lowering valve;
   an accumulator equipped with a pressure sensor in the first path;
   an air drier in the first path between the accumulator and the compressor, the air drier containing reversible desiccating material;
   an exhaust path branching from the first path between the air drier and the compressor, and having a discharge valve for discharging air from the air circuit to the atmosphere;
   a one-way throttle valve in the first path between the accumulator and the air drier that throttles air from the accumulator, but freely passes air from the air drier;
   a vehicle-height controller for operating the compressor to transfer air from the air actuator, via the air drier and the one-way throttle valve, to the accumulator when lowering the vehicle height; and
   a subsidiary controller for opening the discharge valve when both the raising valve and the lowering valve are shut and the pressure of the accumulator exceeds a preset value, thus discharging the air from the accumulator through the one-way throttle valve and the air drier to regenerate the air drier.

3. The air suspension system, as in claim 2, comprising:
   two sets of the air actuators, including a front set corresponding to a front axle of the vehicle and a rear set to a rear axle;
   two sets of air circuits, each corresponding to one of the two air actuator sets, and each including the first path, the second path, the raising valve, and the lowering valve;
   the air compressor, the accumulator, the air drier, the one-way throttle valve, the exhaust path, the discharge valve, the vehicle-height controller, and the subsidiary controller, each commonly used for the two air circuit sets.

4. The air suspension system, as in claim 3, further comprising a check valve, provided in each of the second paths of the two air circuit sets between the lowering valve and the compressor, for preventing flow of air from one set of the air actuators to the other set when both the lowering valves are opened to lower both the front and the rear vehicle height.

* * * * *